United States Patent [19]
Schweikert et al.

[11] Patent Number: 5,706,166
[45] Date of Patent: Jan. 6, 1998

[54] TERMINAL ELEMENT FOR ELECTRICAL CAPACITORS

[75] Inventors: Wilhelm Schweikert; Rainer Hebel, both of Heidenheim, Germany

[73] Assignee: Siemens Aktiengesellschaft, Munich, Germany

[21] Appl. No.: 553,026

[22] Filed: Nov. 3, 1995

[30] Foreign Application Priority Data

Nov. 3, 1994 [DE] Germany .................. 44 39 278.8

[51] Int. Cl.⁶ .................................................. H01G 4/228
[52] U.S. Cl. ..................... 361/520; 361/538; 361/306.1; 429/163; 429/178; 174/176
[58] Field of Search ................................ 429/208, 210, 429/103, 163–164, 166, 170, 178–180, 182; 204/280, 284–285; 361/519–520, 537–540, 303, 306.1; 174/74 R, 176, 188

[56] References Cited

U.S. PATENT DOCUMENTS

| 4,263,379 | 4/1981 | Channing et al. . |
| 5,499,449 | 3/1996 | Carter et al. . |

FOREIGN PATENT DOCUMENTS

| 0295310 A1 | 12/1988 | European Pat. Off. . |
| 0450122 A1 | 10/1991 | European Pat. Off. . |
| 0450122 B1 | 10/1991 | European Pat. Off. . |

*Primary Examiner*—Bot L. Ledynh
*Attorney, Agent, or Firm*—Hill, Steadman & Simpson

[57] ABSTRACT

A terminal element for compensating length tolerances of electrical capacitors, particularly electrolyte capacitors, that are secured to busbars in capacitor batteries is fashioned as a straddling dowel. The terminal element is attached as a length-compensating element in a blind hole located in the capacitor terminal.

12 Claims, 2 Drawing Sheets

TERMINAL ELEMENT FOR ELECTRICAL CAPACITORS

BACKGROUND OF THE INVENTION

The present invention is directed to a terminal element for compensating lengths tolerances for electrical capacitors, particularly electrolyte capacitors, that are secured to busbars in capacitor batteries.

There are applications for which a single electrical capacitor or electrolyte capacitor is not adequate, so that capacitor batteries are constructed in parallel and/or series circuitry. The terminals of the electrical capacitors are thereby connected to busbars. Since capacitors can have tolerances with respect to their overall length, this can lead to problems when assembling a battery when the "rigid" busbar connects the terminals of the individual capacitors. This, for example, can result in a poor electrical contact because of a gap between the busbar and a terminal, or can result from a mechanical overload of the terminals.

It would be fundamentally possible to avoid this problem, for example with flexible connector rails, sections of terminal rail that connect the capacitors to one another or with close tolerances of the capacitor length. However, this leads to problems in assembly or to higher component costs.

SUMMARY OF THE INVENTION

It is an object of the present invention to provide a terminal element that, as a length-compensating element, compensates length tolerances given use of electrical capacitors in capacitor batteries.

This object is inventively achieved in that the terminal element is fashioned as a straddling dowel with an inside thread and in that the terminal element is attached in a blind hole arranged in the capacitor terminal.

In general terms the present invention is a terminal element for compensating length tolerances for electrical capacitors, particularly electrolyte capacitors, that are secured to busbars in capacitor batteries. The terminal element is fashioned as a straddling dowel with inside thread. The terminal element is attached in a blind hole arranged in the capacitor terminal.

Advantageous developments of the present invention are as follows.

The terminal element has a collar and a shaft, the shaft having four slots.

The inside thread is cylindrically fashioned. The shaft has a conical cross-section having a diameter that is smaller at the collar than at the end of the shaft. The end of the shaft can have bevelled surfaces.

The inside thread is conically tapered and the shaft has a cylindrical shape.

The inside thread is not cut entirely up to the end of the shaft and the shaft has a cylindrical shape.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1A:
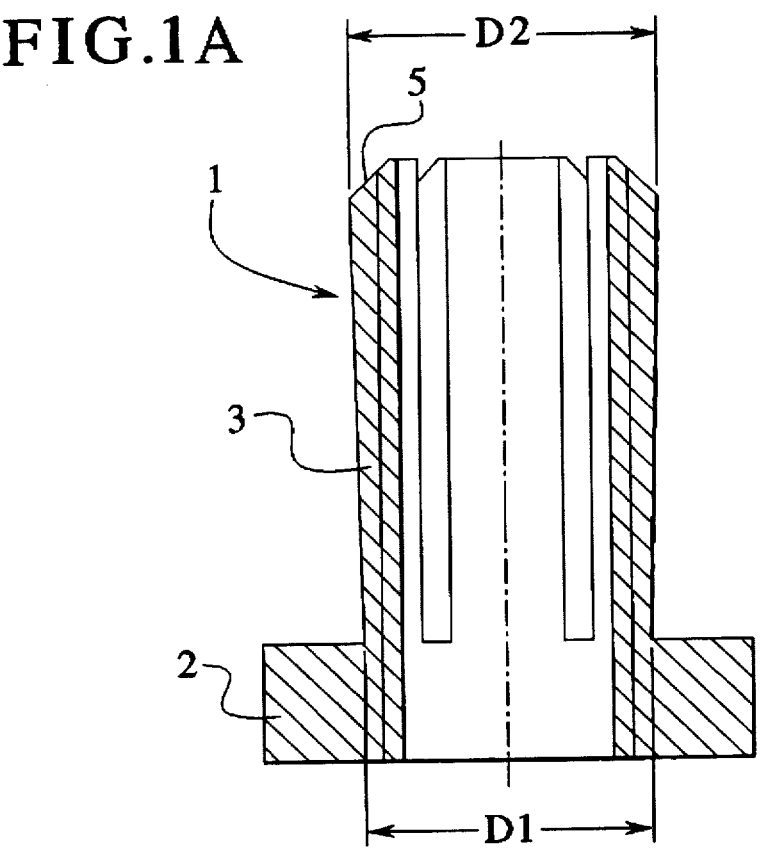
FIG. 1A is a cross-sectional view of a terminal element with conical shaft according to the present invention.
Figure 1B:
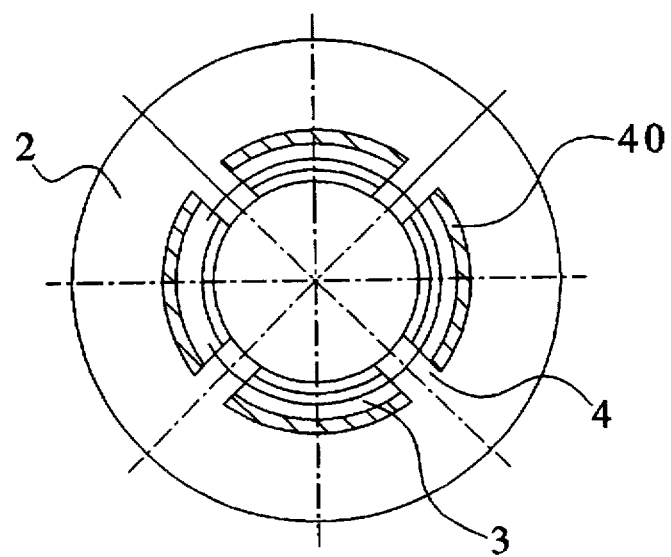
FIG. 1B is a plan view of the FIG. 1A.

FIGS. 1A and 1B depict a terminal element 1. The terminal element 1 is fashioned as a straddling dowel and has a collar 2 and a shaft 3 that is provided with four slots 4. A through, cylindrical inside thread 40 is arranged on the inside of the shaft 3.

The shaft 3 is conically fashioned and has a diameter D1 at that side facing toward the collar 2 that steadily increases to a diameter D2 toward the end of the shaft, so that D2>D1. The terminal element 1 is plugged into a blind hole that is in the terminal located at the capacitor. The diameter D1 at the shaft 3 of the terminal element 1 is selected such that some play is present taking the diameter of the blind hole into account.

Upon introduction of the terminal element 1 into the blind hole, the shaft 3 is compressed because of its conical cross-section with D2>D1, so that the originally cylindrical inside thread steadily tapers in the direction of the shaft end. What is required therefor is that D2 is larger than the largest blind hole diameter. The end of the shaft 3 is provided with bevelled surfaces 5 for ease of introduction into the blind hole.

When the fastening screw is screwed in, the shaft 3 of the metallic terminal element 1 is spread and impresses itself into the soft aluminum of the capacitor terminal.

The terminal element 1 can be brought into the correct position upon impression or can be drawn to the busbar with the partially screwed-in fastening screw.

Figure 2:
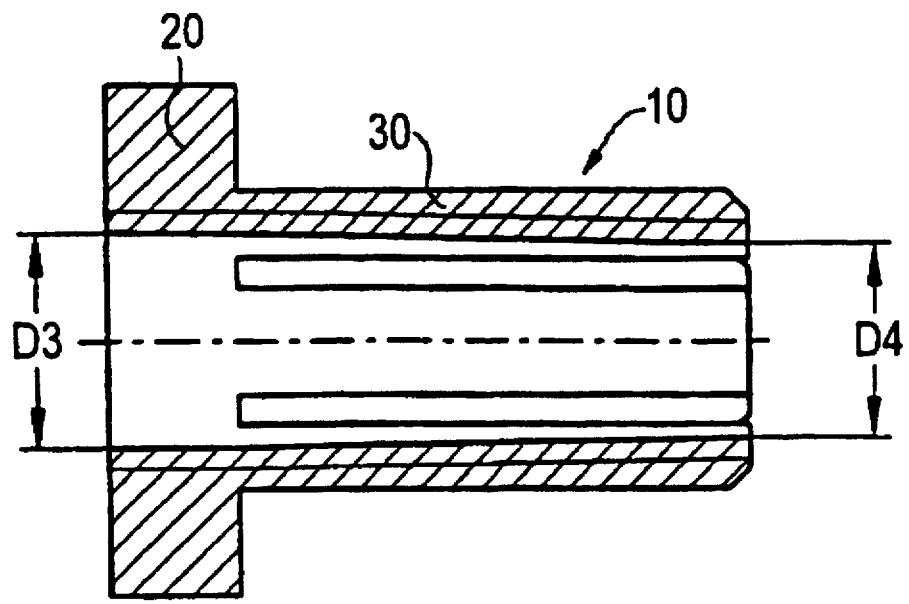
FIG. 2 is a cross-sectional view of a terminal element with a conical inside thread.

FIG. 2 shows a further terminal element 10 wherein, the shaft 30 is cylindrically implemented. The inside diameter of the terminal element 1 is selected such that it has a largest diameter D3 at the side of the collar 20, and steadily tapers to a diameter D4 in the direction of the shaft end. The inside thread is thereby conically tapered with D4<D3. The inside thread can be completely cut to the shaft end or not quite to the shaft end.

The same effect as in the exemplary embodiment of FIG. 1 results when the fastening screw is screwed in, in that the shaft of the terminal element 1 is pressed into the walls of the blind hole.

Figure 3:
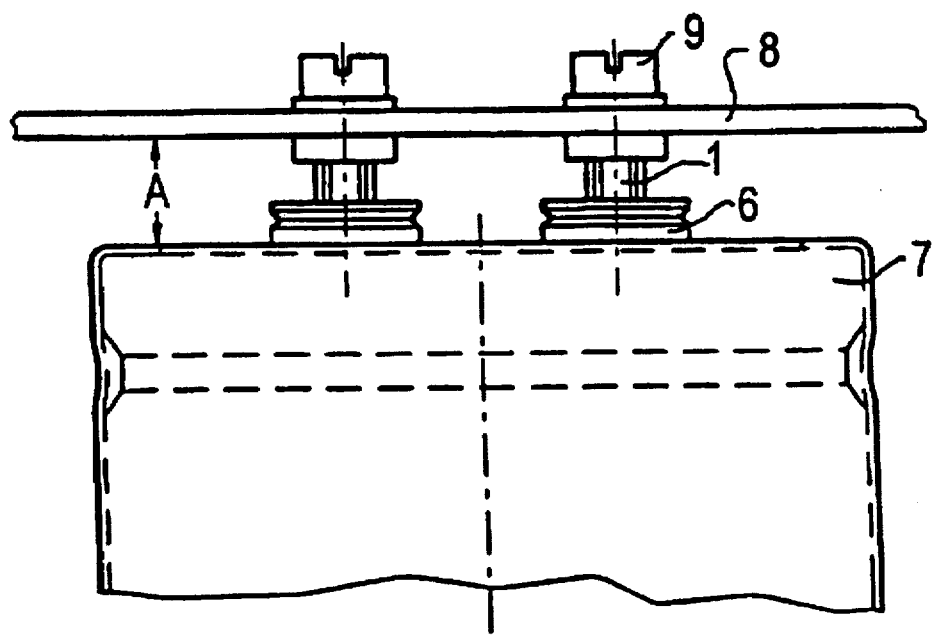
FIG. 3 depicts a capacitor secured to a busbar.

FIG. 3 shows an electrical capacitor 7 whose terminals 6 are secured to a busbar 8 of a capacitor battery using the terminal element 1 and the fastening screws 9. It can be seen from FIG. 3 that the distance A between capacitor 7 and busbar 8 can be varied in a simple way, so that existing length tolerances of the capacitor 7 can be easily compensated.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A terminal element for compensating length tolerances for electrical capacitors that are secured to busbars in capacitor batteries, comprising:

a straddling dowel having an inside thread; and a blind hole located in a capacitor terminal for receiving the straddling dowel;

the straddling dowel having a collar and a shaft, the shaft having a first and a second end, the collar being attached to the first end of the shaft and the shaft having four slots.

2. The terminal element according to claim 1, wherein the inside thread is cylindrically fashioned; and wherein the shaft has a conical cross-section having a diameter that is smaller at the collar than at the second end of the shaft.

3. The terminal element according to claim 2, wherein the second end of the shaft has bevelled surfaces.

4. The terminal element according to claim 1, wherein the inside thread is conically tapered; and wherein the shaft has a cylindrical shape.

5. The terminal element according to claim 1, wherein the inside thread is cut partially up to the first end of the shaft; and wherein the shaft has a cylindrical shape.

6. A terminal element for compensating length tolerances for electrical capacitors that are secured to busbars in capacitor batteries, comprising:

a straddling dowel having a collar and a shaft, said shaft having a first and a second end and also having an inside thread, the collar being attached to the first end of the shaft, said shaft also having four slots; and a blind hole located in a capacitor terminal for receiving the straddling dowel.

7. The terminal element according to claim 6, wherein the inside thread is cylindrically fashioned; wherein the shaft has a conical cross-section having a diameter that is smaller at the collar than at the second end of the shaft; and wherein the second end of the shaft has bevelled surfaces.

8. The terminal element according to claim 6, wherein the inside thread is conically tapered; and wherein the shaft has a cylindrical shape.

9. The terminal element according to claim 6, wherein the inside thread is cut partially up to the first end of the shaft; and wherein the shaft has a cylindrical shape.

10. A terminal element for compensating length tolerances for electrical capacitors that are secured to busbars in capacitor batteries, comprising:

a straddling dowel having a collar and a shaft, said shaft having a conically tapered inside thread, said shaft having a conical cross-section with a diameter that is smaller at the collar than at an opposed end of the shaft;

a blind hole located in a capacitor terminal for receiving said shaft;

the shaft having four slots.

11. The terminal element according to claim 10, wherein said opposed end of the shaft has bevelled surfaces.

12. The terminal element according to claim 10, wherein the inside thread is cut partially up to the end of the shaft to which the collar is attached; and wherein the shaft has a cylindrical shape.

* * * * *